US012583256B2

(12) United States Patent
Murawa et al.

(10) Patent No.: US 12,583,256 B2
(45) Date of Patent: Mar. 24, 2026

(54) PORTAL AXLE FOR A RAIL VEHICLE AND METHOD FOR MANUFACTURING A PORTAL AXLE OF THIS TYPE

(71) Applicant: Bochumer Verein Verkehrstechnik GmbH, Bochum (DE)

(72) Inventors: Franz Murawa, Bochum (DE); Xie He, Düsseldorf (DE)

(73) Assignee: Bochumer Verein Verkehrstechnik GmbH, Bochum (DE)

( * ) Notice: Subject to any disclaimer, the term of this patent is extended or adjusted under 35 U.S.C. 154(b) by 0 days.

(21) Appl. No.: 18/724,092

(22) PCT Filed: Dec. 21, 2022

(86) PCT No.: PCT/EP2022/087143
§ 371 (c)(1),
(2) Date: Jun. 25, 2024

(87) PCT Pub. No.: WO2023/126265
PCT Pub. Date: Jul. 6, 2023

(65) Prior Publication Data
US 2025/0065671 A1      Feb. 27, 2025

(30) Foreign Application Priority Data

Dec. 27, 2021    (DE) ......................... 102021006368.6

(51) Int. Cl.
| | |
|---|---|
| *B60B 35/00* | (2006.01) |
| *B22D 27/00* | (2006.01) |
| *B22D 27/18* | (2006.01) |
| *B60B 35/04* | (2006.01) |

(52) U.S. Cl.
CPC .......... *B60B 35/002* (2013.01); *B22D 27/006* (2013.01); *B22D 27/18* (2013.01);
(Continued)

(58) Field of Classification Search
CPC . B60B 35/002; B60B 35/04; B60B 2310/202; B60B 2310/542;
(Continued)

(56) References Cited

U.S. PATENT DOCUMENTS

| | | |
|---|---|---|
| 11,186,120 B2 | 11/2021 | Murawa |
| 2002/0189490 A1 | 12/2002 | Kasprzyk et al. |

(Continued)

FOREIGN PATENT DOCUMENTS

| | | |
|---|---|---|
| CZ | 20920 U1 | 5/2010 |
| DE | 3328321 C2 | 8/1992 |

(Continued)

OTHER PUBLICATIONS

Machine translation of KR 101144335 B1, 12 pages (Year: 2012).*

(Continued)

*Primary Examiner* — S. Joseph Morano
*Assistant Examiner* — Emily G. Castonguay
(74) *Attorney, Agent, or Firm* — The Webb Law Firm

(57) ABSTRACT

A portal axle as well as a method for manufacturing a portal axle for a rail vehicle, which has an axle centre part extending along a longitudinal axis and two kingpins, one of which sits on a first end section of the axle centre part and a second on a second end section of the axle centre part formed opposite to the first end section. The kingpins are oriented away from the axle centre part and form an axis of rotation in use for a rail wheel rotatably mounted on the respective kingpin. The portal axle has optimised usage properties with minimised weight. This is achieved by a longitudinal opening extending in the longitudinal direction of the portal axle being formed in at least one of the mould components. The invention further provides a method for manufacturing an axle of this type.

14 Claims, 3 Drawing Sheets

(52) U.S. Cl.
CPC ........ B60B 35/04 (2013.01); *B60B 2310/202*
(2013.01); *B60B 2310/542* (2013.01); *B60B*
*2360/102* (2013.01); *B60B 2900/111*
(2013.01); *B60B 2900/141* (2013.01); *B60B*
*2900/212* (2013.01); *B60B 2900/311* (2013.01)

(58) Field of Classification Search
CPC ........ B60B 2360/102; B60B 2900/111; B60B
2900/141; B60B 2900/212; B60B
2900/311; B61F 3/16; B22D 27/006;
B22D 27/18
See application file for complete search history.

(56) References Cited

U.S. PATENT DOCUMENTS

| | | |
|---|---|---|
| 2010/0308612 A1 | 12/2010 | Antunes et al. |
| 2012/0060719 A1* | 3/2012 | Nishimura ............... B61F 3/08 |
| | | 105/182.1 |
| 2020/0180358 A1 | 6/2020 | Fenaroli et al. |

FOREIGN PATENT DOCUMENTS

| | | | | |
|---|---|---|---|---|
| EP | 0523472 | B1 | 8/1995 | |
| EP | 1258410 | B1 | 10/2003 | |
| EP | 1667884 | B1 * | 3/2008 | ......... B60B 17/0006 |
| EP | 1769940 | B1 | 11/2012 | |
| EP | 2229461 | B1 | 5/2019 | |
| EP | 3490867 | B1 | 4/2021 | |
| JP | 2012121505 | A | 6/2012 | |
| KR | 101144335 | B1 * | 5/2012 | ............... B61F 3/16 |
| WO | 2018046745 | A1 | 3/2018 | |

OTHER PUBLICATIONS

"Merkblatt 447—Warmebehandlung von Stahl—Nitrieren und Nitrocarburieren" ("Leaflet 447—Heat treatment of Steel—Nitriding and Nitrocarburizing"), Stahl-Informations—Zentrum (Steel Information Centre), 2005, Düsseldorf, Germany (statement of relevance attached).

\* cited by examiner

PORTAL AXLE FOR A RAIL VEHICLE AND METHOD FOR MANUFACTURING A PORTAL AXLE OF THIS TYPE

CROSS-REFERENCE TO RELATED APPLICATIONS

This application is the United States national phase of International Application No. PCT/EP2022/087143 filed Dec. 21, 2022, and claims priority to German Patent Application No. 10 2021 006 368.6 filed Dec. 27, 2021, the disclosures of which are hereby incorporated by reference in their entireties.

BACKGROUND OF THE INVENTION

Field of the Invention

The invention relates to a portal axle for a rail vehicle, with an axle centre part extending along a longitudinal axis and two kingpins, one of which is positioned on a first end section of the axle centre part and a second on a second end section of the axle centre part formed opposite to the first end section, wherein the kingpins are oriented pointing outwards away from the axle centre part and form an axis of rotation for a rail wheel rotatably mounted on the respective kingpin in use. The axle centre section and the kingpins thus form the basic elements of the portal axle and are therefore referred to as "moulded components" of the portal axle, regardless of whether the portal axle is produced in one piece or is composed of individual prefabricated components.

A portal axle to which the present invention relates may comprise additional mould components. This includes flanges which are provided for supporting the kingpins on the axle centre part, or carrier or support sections and the like, which may be provided for the fastening or abutment of functional components, such as components of a suspension system of the respective rail vehicle.

Portal axles of the type in question here are used in particular as "inverted portal axles" for low-floor vehicles, such as trams or light rail.

DESCRIPTION OF RELATED ART

In the case of "inverted portal axles", the axle centre section does not form a yoke on which the kingpins are suspended in use or which is supported on the kingpins. Rather, in the case of inverted portal axles, the kingpins sit on the axle centre part so that the axle centre part represents a beam, on the end sections of which the kingpins are supported. Examples of portal axles of this type are shown in EP 1,258,410 B1 and on the applicant's website on www.bochumer-verein.de.

Due to their special design, the space available in the operating position between the kingpins above the upper side of the axle centre section of the height of a structure, in particular the passenger cab, of the respective rail vehicle can be added in the case of wheel sets with inverted portal axles. This makes it possible, for example, for low-floor rail vehicles to lower the floor height of the chassis of the low-floor vehicle above the wheel set and to offer passengers even passage through the vehicle in addition to a low entry height.

A particular challenge in the design of inverted portal axles for low-floor vehicles is that the portal axles are exposed to high loads in use on the one hand, but that they should also have the lowest possible weight in order to achieve a minimised need for drive energy and optimised driving behaviour of the rail vehicle equipped with them.

Based on the state of the art explained above, the object has emerged against this background of specifying a portal axle of the type explained at the outset which has optimised usage properties with minimised weight.

A method for the manufacture of a portal axle of this type is also to be mentioned.

SUMMARY OF THE INVENTION

A portal axle that achieves this object according to the invention has at least the characteristics specified herein.

A method solving the above-mentioned problem according to the invention is mentioned herein.

Advantageous configurations of the invention are indicated in the dependent claims and, like the general concept of the invention, are explained in detail in the following.

In accordance with the state of the art explained at the outset, a portal axle according to the invention for a rail vehicle thus has the following moulded components:

an axle centre section extending along a longitudinal axis, and two kingpins, one of which sits on a first end section of the axle centre part and a second on a second end section of the axle centre part formed opposite to the first end section, wherein the kingpins are oriented away from the axle centre part and form an axis of rotation in use for a rail wheel rotatably mounted on the respective kingpin.

According to the invention, a longitudinal opening extending in the longitudinal direction of the portal axle is now formed in at least one of the moulded components, in other words at least in the axle centre part and/or at least in one of the kingpins.

According to the design of a portal axle according to the invention, a method according to the invention for manufacturing a portal axle formed according to one of the preceding claims comprises the following work steps:

a) provision of a portal axle blank comprising the "axle centre part" and "kingpin" moulded components;

b) introduction of a longitudinal opening in at least one of the mould components;

c) optional edge layer treatment of the portal axle in the region of an inner surface of the longitudinal opening and/or in the region of an outer surface of the portal axle;

d) optional oxidation of at least the inner surface of the longitudinal opening and/or in the area of an outer surface of the portal axle.

On the one hand, the weight of the portal axle is reduced by the longitudinal opening formed in the axle centre part and/or the kingpins in a portal axle according to the invention.

On the other hand, the longitudinal opening provided according to the invention can be used for an inspection of the portal axle. For example, the respective longitudinal opening allows a measuring device to be guided into the interior of the respective moulded component "kingpin" or "axle centre part" to check for cracks originating from the component surface and comparable damage and thus to carry out a targeted examination without having to remove the rail wheels mounted on the portal axle or perform other complex disassembly and assembly work.

The longitudinal opening provided according to the invention can be arranged in the respective moulded component of the portal axle in such a way that there is no weakening of the stability of the moulded component in question individually or of the portal axle as a whole. Rather, the longitudinal openings can be positioned in such a way that the moment of resistance of the axle centre section and kingpin is increased by the corresponding design of the outer contours.

With regard to the weight saving and the possibility of simple inspection from the inside of the respective moulded component, it proves to be particularly advantageous if at least one longitudinal opening is moulded into each of the mould components "kingpin" and "axle centre part" of a portal axle according to the invention.

The weight saving and accessibility for inspection purposes can be optimised in that the respective longitudinal opening is designed as a through-opening that passes through the respective mould component.

With regard to the testability of a portal axle according to the invention, the advantage of the longitudinal openings provided according to the invention in the portal axle is that the volume of the portal axle subjected to bending during operation can be tested with high accuracy for cracks created transverse to the direction of stress in the installed state. Ultrasonic test heads with an angle of 40° to 75° are usually used for this purpose. If they are moved in the axial direction through the longitudinal openings, they can reliably detect crack formations possibly originating from the outer surfaces of the axle even when assembled. In the case of conventional low-floor wheel sets, this would require complex disassembly of the rail wheels and their idler wheel bearings in order to check, for example, the radius transitions from the kingpin to the assigned flange of the portal axle, which is particularly at risk of cracking due to the notching effect, by means of a conventional surface crack test.

In the event that the kingpins each have a longitudinal opening formed as a through-opening, a maximisation of the weight saving can be achieved by the longitudinal opening having a first section extending in the longitudinal direction of the longitudinal opening and a second section extending up to the free end face of the kingpin, the diameter of which is smaller than the diameter of the first section. Such a graduated design of the longitudinal opening may also contribute to the reliability with which a check of the kingpins for cracks can be performed by means of an ultrasonic measuring device inserted into the longitudinal opening by moving the section of larger diameter to an area in which the kingpin or the flange optionally supporting it has a larger volume. Due to the larger diameter of the longitudinal opening section provided in this area, the measuring device used for detecting cracks can also be brought closer to the zone potentially susceptible to crack formation in a large-volume area of the flange or the kingpin.

The weight saving achieved in the axle centre part can be maximised by the fact that at least two longitudinal openings are formed in the axle centre part, wherein these preferably extend parallel to each other and axially parallel to the longitudinal axis of the axle centre part. In this configuration, the longitudinal openings are also advantageously designed as through-openings with a view to maximising the weight saving and optimising accessibility, which lead from the side of the axle centre part assigned to the one kingpin to the other axle centre part assigned to the other kingpin. In the case of two or more longitudinal openings of the axle centre part, their diameters may differ if this is indicated for static reasons or for space reasons. Thus, for example, a longitudinal opening arranged centrally with a larger diameter with respect to a cross-section oriented transverse to the longitudinal axis of the axle centre part can be combined with one or two longitudinal openings with a smaller diameter arranged laterally from it. The number of longitudinal openings formed in the axle centre part is preferably limited to a maximum of three. This applies in particular if the longitudinal openings are designed as through-openings.

A portal axle according to the invention is in particular provided to be used as an "inverted portal axle" for a low-floor wheel set. The use of an inverted portal axle in wheel sets of this type ensures that both wheels of the respective wheel set run on the same centre axle and thus toe and camber deviations are avoided, which can negatively impact the track guidance behaviour of the rail vehicle on the track when independent wheel suspensions are used.

In the event that a portal axle according to the invention is used as an "inverted portal axle" for low-floor wheel sets, the axle centre part has an upper side assigned in use to a structure of the rail vehicle on which the kingpins are positioned. The kingpins may be supported by flanges that stand on the end section of the axle centre section assigned to the respective kingpin and from which the kingpins protrude laterally outwards away from the axle centre section. The flanges supporting the kingpins protruding from them make it possible to lower the axle centre section relative to the axis of rotation defined by the kingpins such that a maximised space is available for the positioning of the chassis or the rail vehicle body above the axle centre section of the portal axle. At the same time, the flanges can be used, for example, for internally mounted wheel sets to support the primary suspension, by means of which the wheel set equipped with the relevant portal axle is supported on the chassis.

In principle, it is conceivable to assemble a portal axle of the type according to the invention from individually prefabricated moulded components.

In view of the fact that a portal axle according to the invention must also reliably transfer all stresses occurring during operation between the track and the vehicle during the entire service life of the rail vehicle, it has proven to be expedient if the portal axle according to the invention with its moulded components is manufactured from a steel material in one piece. Forming the blank from a suitable steel material using forging and/or casting technology is suitable for this purpose.

Due to the mechanical properties that can be achieved by forging, the axle centre section is preferably forged in one piece with the flanges of the portal axle optionally moulded on it. In this case, the kingpins can be forged in one piece to the axle centre part or, in particular, to the optionally available flanges in one piece. Alternatively, however, it is also possible to press, shrink or glue the kingpins into correspondingly provided openings of the optionally available flanges or of the axle centre part. The quenched and tempered steels specified in DIN EN ISO 683 are particularly suitable as steel material for the forging-related production of a portal axle according to the invention. The steel grades 30CrNiMo8, 34CrNiMo6, 42CrMo4, 25CrMo4 or C45 are preferably used.

After forging, the portal axle blank obtained can be subjected to a heat treatment, by means of which the portal axle is given the mechanical properties required by standards or other regulations in each case in a known manner. Heat treatment typically also includes stress-relieving annealing, which prevents the occurrence of distortion that could otherwise occur in downstream machining processes due to freeing residual stresses. Heat treatment of this type, in particular stress-relieving annealing, can take place in an equally known manner as an intermediate step or additional work step between individual substeps of the mechanical machining of the portal axle carried out after the forging production if the need arises for this.

The longitudinal openings can be moulded into the kingpins and/or the axle centre section in any way known from the state of the art. Known drilling or comparable machining processing methods are particularly suitable for this purpose.

In order to avoid damage to the portal axle in the region of its respective longitudinal opening provided according to the invention caused by corrosive attacks and to ensure optimal coupling of the measuring device to the respective area to be examined during the crack test, the longitudinal opening can be treated with corrosion protection at least on its inner surface.

In principle, it would be conceivable to apply a conventional corrosion inhibitor, such as a paint coating, to the surface at risk of corrosion for this purpose. However, the coating of longitudinal openings is complex and the quality of the work result can only be checked with great effort. In addition, an additional coating of this type would have to be removed at each crack inspection if this is to be carried out by ultrasound in the known manner.

According to a embodiment that is particularly relevant to practice, the invention therefore proposes that the longitudinal opening provided according to the invention be subjected to a chemical/thermal heat treatment process after carrying out the mechanical processing, through which a high resistance against corrosion attack is achieved in addition to a significant increase in component strength.

The edge layer treatment is preferably carried out as a chemical/thermal edge layer treatment in which a hardening of the edge layer is effected in a known manner by means of heat-induced and supported diffusion, for example of N and/or C atoms into the edge layer in question. The methods available for this purpose are known in themselves from the state of the art (see, for example, leaflet "MB447 Heat treatment of steel—Nitriding and nitrocarburizing", edition 2005, ISSN 0175-2006, published by the Steel Information Centre, Düsseldorf, Germany) and are described in connection with the area of technology in question here, for example, in EP 1 769 940 B1, which concerns an edge layer-hardened impeller shaft for rail vehicles. The surface layer treatment is preferably carried out as gas, bath or plasma nitriding.

It has been determined that the corrosion protection can be achieved particularly effectively by thermal/chemical edge layer treatment, as a result of which the portal axle according to the invention has a hardness at least in the region of the inner surface of the respective longitudinal opening in an edge layer bordering on the respective inner surface of the longitudinal opening, which is increased compared to the hardness that the portal axle has in a core region present outside the edge layer.

The edge layer treatment optionally carried out according to work step c) of the method according to the invention is limited to just the respective longitudinal opening according to a first variant of the method according to the invention.

Alternatively, the edge layer treatment carried out in work step c) can also cover an outer surface of the portal axle which is exposed to particular corrosive or mechanical loads during use. In this case, the edge layer treatment can be limited to a certain surface section of the portal axle, but preferably carried out in such a way that the portal axle is treated on its entire outer surface.

A particular advantage of the edge layer treatment optionally provided according to the invention is achieved if, after work step b) of the method according to the invention in work step c), not only the longitudinal openings of the portal axle are treated in this way, but the entire portal axle. Surface layer treatment covering the entire portal axle allows the vibration resistance of the portal axle to be increased by 10 to 40%, especially in the more heavily notched areas, such as in the area of the transition from the axle centre part to the flanges or, in the case of a forged kingpin, in the area of the transition from the kingpin to the supporting flange. The increase in strength that can be achieved by the edge layer treatment provided according to the invention has a favourable effect in particular in portal axles which have small transition radii due to the narrow available installation space and thus have an associated high susceptibility to crack formation as a result of notching. In the area of the bearing seats of the kingpins in particular, an increase in durability of up to approx. 60% can also be achieved by combining the edge layer treatment of the kingpins and a downstream coating of the bearing seats with a molybdenum spray layer. In the case of portal axles with joined kingpins, in addition to the portal axle, it is also expedient to subject the kingpins, which have stress-increasing recesses and shoulders on the surface due to the bearing and seal seats, to corresponding surface coating treatment.

By means of an edge layer treatment of the type explained above encompassing the portal axle as a whole, an alternating strength can be achieved that is so greatly increased compared to portal axes without edge layer treatment that a portal axle according to the invention can have significantly smaller cross-sections with the same load capacity. This also contributes effectively to reducing the installation space required for the portal axle itself in the area between the wheels. The space thus gained for the design of the chassis or the body of the rail vehicle can be used for widened passages in the vehicle body in low-floor vehicles that are used as trams or light rail to increase customer satisfaction.

At the same time, if edge layer treatment carried out in the manner described above also covers the outer surfaces of the portal axle, as is the case with an edge layer treatment covering the portal axle as a whole, a high level of corrosion resistance is also achieved in the region of these outer surfaces. Practical experience shows that corrosion resistance achieved in this way is sufficient to do without additional corrosion protection coatings on the portal axle. At the same time, the hardness achieved by the edge layer treatment in the area of the edge layer and the associated resistance on the free surfaces of the portal axle is so high that the portal axle is sufficiently protected against external mechanical attacks such as stone chipping as a result of flying gravel. In the case of conventional portal axles that are not surface-treated, damage caused by such attacks causes severe stress-increasing notches, which promote the formation of cracks if they are not regularly eliminated within a short space of time. The inspection intervals can be significantly extended by the optionally proposed edge layer treatment according to the invention, achieving a considerable cost saving.

In addition, it can contribute to the optimisation of the corrosion protection in the region of the longitudinal opening provided according to the invention if at least the inner surface of the longitudinal opening is provided with an oxide layer. Corrosion resistance can also be supported in the area of at least one outer surface of the portal axle by the targeted formation of an oxide layer. The respective oxide layer can, for example, be generated by targeted oxidation of the connecting layer which has formed during the edge layer treatment of the mould components on the component surface. For this purpose, oxidising the bonding layer after the edge layer treatment of the mould components with the addition of oxygen at temperatures between 350° C. and 570° C. has been proven to be effective. The free iron molecules and iron nitrides react with the oxygen that has been introduced to form stable iron oxide, which is deposited as a thin oxide layer on the surface of the component, filling the existing pores in the connecting layer with oxide. This layer is extremely chemically resistant and gives the moulded components a particularly high level of corrosion resistance. Wheel sets equipped with portal axles designed according to the invention have a reduced weight compared to wheel sets with conventional portal axles. Low wheel set weights mean low unsprung masses and thus fewer vibrations, for example when a tram equipped with a wheel set of this type drives through a residential district. At the same time, the reduced weight reduces the consumption of drive energy and minimises wear and tear on the vehicle and roadway.

A wheel set formed using a portal axle according to the invention, in particular used in an inverted arrangement, for use in rail vehicles in which the connection between the portal axle and the chassis occurs inside, i.e. between the wheels, accordingly comprises an inverted portal axle designed according to the invention and two rail wheels, which are typically mounted on the two kingpins of the portal axle by means of tapered roller bearing units.

In the case of impeller sets with braked rail wheels, the portal axle according to the invention can additionally be provided with brake calliper hubs, which secure the bearings against axial displacement and on which a brake calliper of brake devices fastened for braking the rail wheels is mounted in each case. Brake discs are attached to the rail wheels on which the braking device acts during braking.

In the case of driven wheel sets, in other words wheel sets with driven rail wheels, drive couplings are provided instead of the brake discs and the brake calliper hubs, by means of which the respective rail wheel is coupled to the drive of the rail vehicle. In a similar manner to the brake calliper hubs, the bearing of the respective driven rail wheel can be fixed either by means of a longitudinal or transverse press connection with a hub or by means of a bearing locking cover which is screwed to the kingpin. This axial fixation can be achieved by means of both a central screw connection and a direct screw connection. The advantage of retaining the brake calliper seat on the kingpin for bearing fixation is that the portal axles for the drive and travel wheel sets of a vehicle can be designed identically, but the disadvantage is that the brake calliper hub seats require additional clearances and more space remains within the clearance profile of the vehicle for the drives when the bolting solution is used.

In addition, it is conceivable to carry out the bearing fixing by means of correspondingly designed bearing securing covers as for the drive wheel sets, in particular for unbraked travel wheel sets. In the case of braked travel wheel sets, the brake callipers can also be mounted on the trolley frame. However, this would have the disadvantage that the primary suspension between the chassis and low-floor wheel set would have an impact on the contact surface of the brake lining/friction ring.

Alternatively, the bearing retainer covers could also be designed in such a way that they can also accommodate the brake callipers. In this case, the bearing retainer covers must be connected to the kingpins in such a way that the high torques occurring due to the brake forces are transmitted in a torsionally stable manner. This anti-twist protection can be achieved both by means of spur and longitudinal toothing between the kingpins and bearing locking covers set up for holding brake callipers, as well as, depending on the torques to be transferred, by solutions with dowel pins or heavy-duty clamping sleeves.

The brake and drive devices of the type mentioned here as well as their individual components, function and assembly are known to the person skilled in the art from the state of the art. Both rail wheels mounted on a portal axle according to the invention are not necessarily braked or driven. Rather, the brake discs and devices for holding brake callipers may be missing from unbraked travel wheel sets. In the case of travel wheel sets with brakes on one side, a brake calliper hub and optionally a hub for axial bearing fixing can only be provided for one rail wheel. Similarly, it is possible to couple a drive wheel set that is driven on one side with only one of the rail wheels mounted on the portal axle according to the invention via a suitable coupling device with the drive of the rail vehicle, whereas the other rail wheel mounted on the portal axle runs loosely unbraked and undriven in use. Alternatively, in the case of a drive wheel set that is driven on one side, the one rail wheel mounted on the portal axle can be driven and a brake disc and brake calliper hub can be provided for the other rail wheel in order to be able to brake it in use by means of a suitable braking device.

In the case of low-floor wheel sets which have an external bearing due to the track width or the vehicle concept, the design is limited to travel wheel sets with and without brake discs. In these cases, the kingpin is extended outwards via the seat for holding the brake calliper hub or, in the case of unbraked idler wheels, optionally the hub for axial fixation of the bearing without a holding device for brake calliper hubs, in order to enable an additional seat for holding the axle bearing.

The rail wheels of wheel sets equipped with portal axles according to the invention can be designed as rubber-sprung wheels, as for example described in DE 33 28,321 C2, or, preferably, as hybrid wheels, as shown in WO 2018/046745 A1.

BRIEF DESCRIPTION OF THE DRAWINGS

The invention is explained in more detail below on the basis of a drawing representing an exemplary embodiment. The schematic drawings show the following.

DESCRIPTION OF THE INVENTION

Figure 1:
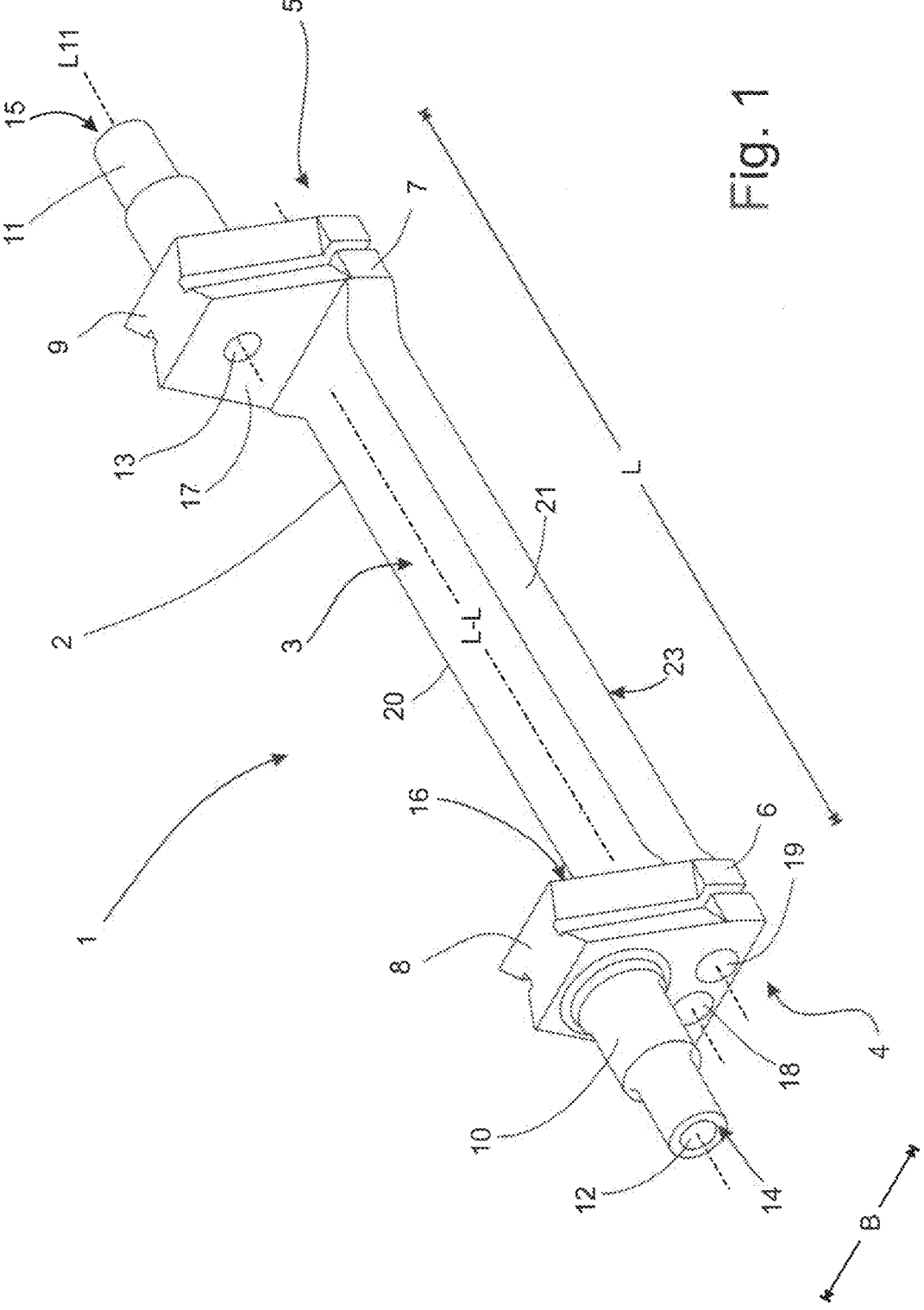
FIG. 1 a portal axle for a wheel set of a low-floor rail vehicle.

The portal axle 1 is forged in one piece from a suitable quenched and tempered steel composed in accordance with DIN EN ISO 683. In this case, the portal axle 1 has an axle centre part 2 which has the basic shape of a flat rectangle with a length L extending along a longitudinal axis L-L which is greater than the width B of the axle centre part 2.

The axle centre part 2 has an upper side 3, which is assigned in use to a chassis of a low-floor rail vehicle (not shown here). In each of the end sections 6, 7 of the axle centre part 2 adjoining the narrow sides 4, 5 of the axle centre part 2, there is a flange 8, 9 which is formed in one piece with the axle centre part 2. In the longitudinal side view (FIG. 5) the portal axle thus has the basic shape of a "U", the legs of which are formed by the flanges 8, 9 and the base of which is formed by the axle centre part 2.

Figures 2, 3:
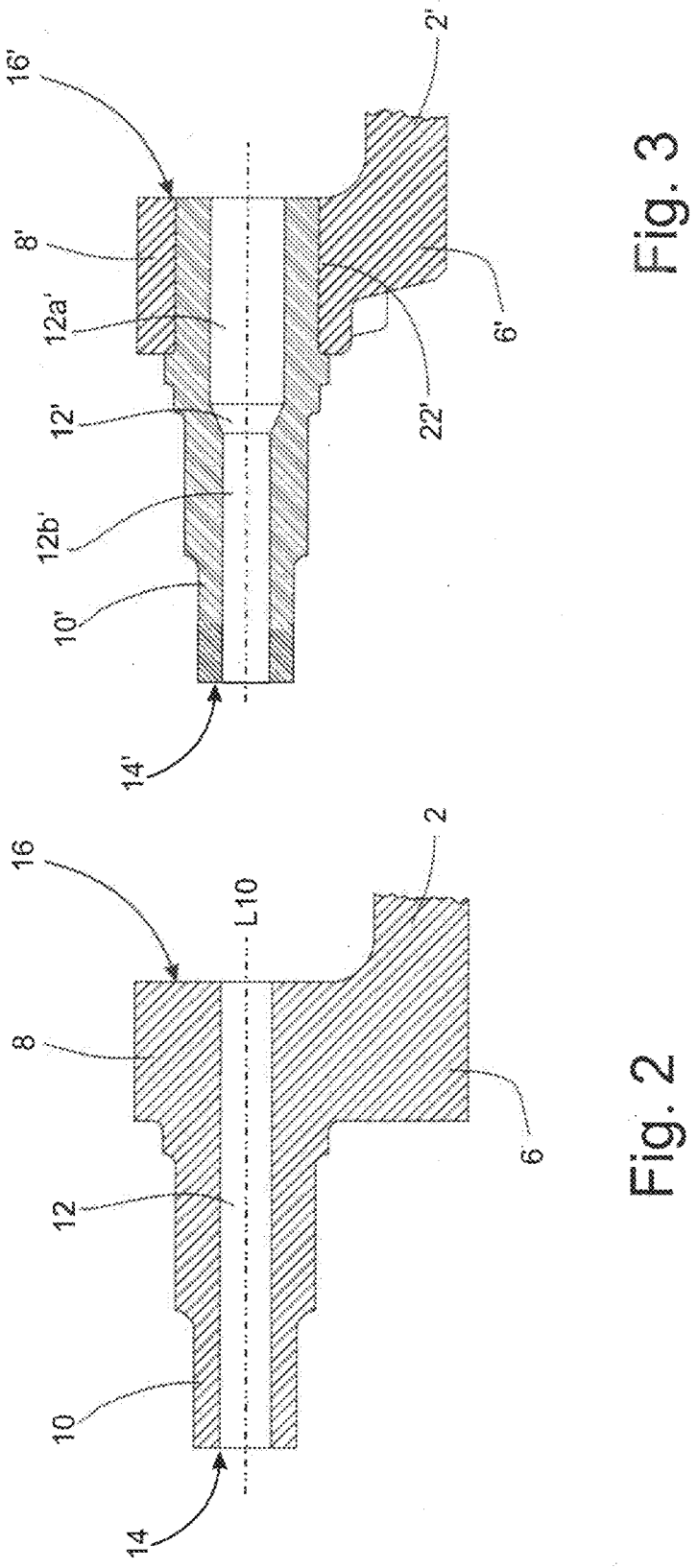
FIG. 2 a section of the portal axle in a section along the longitudinal axis L-L of the portal axle shown in FIG. 1.
FIG. 3 a section of an alternative configuration of the portal axle in a sectional view corresponding to FIG. 2.
Figures 4, 5:
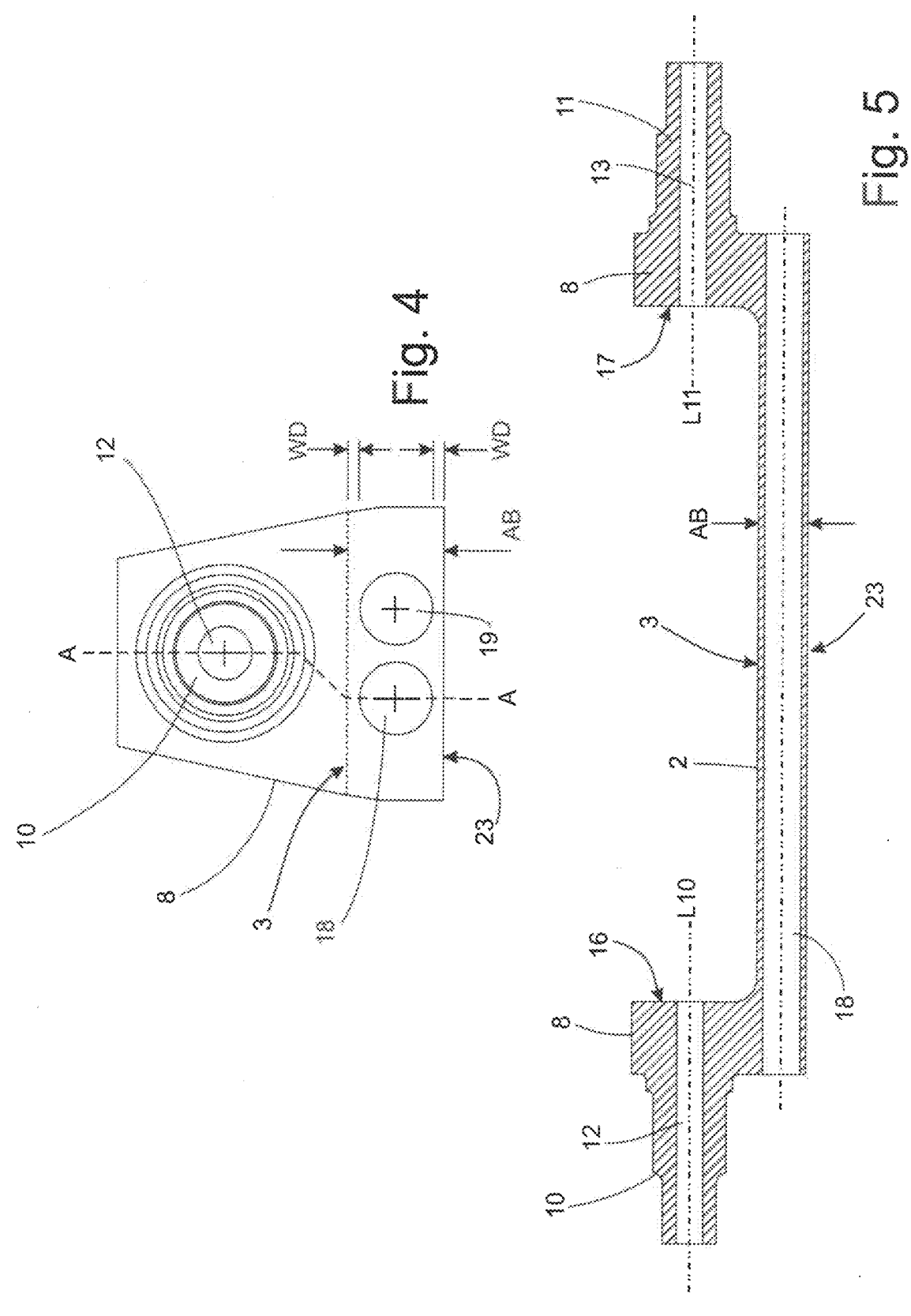
FIG. 4 a frontal view of the portal axle.
FIG. 5 a longitudinal section of the portal axle along the section line A-A shown in FIG. 4.

In a first embodiment, the longitudinal section of which is shown in FIGS. 2 and 5, a kingpin 10, 11 directed outwards away from the axle centre part 2 is forged in one piece on each of the flanges 8, 9. The longitudinal axes L10, L11 of the kingpins 10, 11 are aligned coaxially to each other and parallel to the central longitudinal axis L-L of the axle centre part 2.

The kingpins 10, 11, the flanges 8, 9 and the axle centre part 2 form moulded components from which the portal axle 1 is formed.

In the embodiments shown in FIGS. 1, 2, 4 and 5, a longitudinal opening 12, 13 is drilled in each of the kingpins 10, 11, which leads as a through-opening with a constant opening cross-section from the free end face 14, 15 of the kingpin 10, 11 to the side surface 16, 17 facing the axle centre part 2 of the flange 8, 9 bearing the respective kingpin.

In addition, two longitudinal openings 18, 19 are drilled into the axle centre part 2 starting from its narrow side 4 assigned for example to the flange 8, which extend as through-openings from the narrow side 4 to the opposite narrow side 5 of the axle centre part 2 and are aligned in parallel to each other and to the longitudinal axis L-L of the axle centre part 2 in such a way that they are positioned at the same distance from the next adjacent longitudinal side 20, 21 of the axle centre part 2. The diameter of the longitudinal openings 18, 19 is dimensioned in such a way that there is a minimum wall thickness WDmin between the upper side 3 and the opposite lower side 23 of the axle centre part 2 in each case, which corresponds to 0.1 to 0.25 times the distance AB between the upper side 3 and the lower side 23 ($0.1 \times AB \leq WDmin \leq 0.25\ AB$). For example, the wall thickness WD is in practice equal to 0.125 times the distance AB between top side 3 and bottom side 23 ($WD = 0.125 \times AB$).

After the forging technique production of the portal axle 1 carried out in the usual manner, heat treatment carried out in the same known manner to set the mechanical properties, a stress-relieving annealing also carried out conventionally, the drilling of the longitudinal openings 12, 13, 18, 19 and the mechanical finishing of the entire outer contour of the portal axle except for the seats for bearings, seals and brake calliper hubs, which were finally coated with molybdenum, the portal axle 1 was subjected to edge layer treatment.

In this surface layer treatment, the portal axle 1 was nitrided over a period of 84 h and at a temperature of 520° C. in an atmosphere consisting of ammonia gas. The portal axle was then subjected to an oxidation process in a conventional manner.

After the edge layer treatment, the portal axle 1 exhibited an increased Vickers hardness of 790 HV compared to the base material of 340 HV in the region of its surfaces including the inner surfaces of the longitudinal openings 12, 13, 18, 19. The total thickness of the edge layer was approx. 0.7 mm.

The surfaces were then subjected to various corrosion tests and blasting tests with gravel to verify impact resistance. Compared to conventional portal axles, the surface-coated axle showed no signs of corrosion either in salt spray tests or during storage over a period of 3 months under extreme conditions in an acid-laden atmosphere. The shooting tests were carried out with track gravel and an impact speed of up to 360 km/h. The component surfaces were subsequently still intact.

The alternative embodiment of a portal axle shown in FIG. 3 is based on the portal axle 1 shown in FIGS. 1, 2, 4 and 5. In this case, the flanges 8' of the alternative embodiment of the portal axle each bear a separately prefabricated kingpin 10', which is shrunk in a known manner in itself into an opening 22' provided in the respective flange 8' or fixed in another suitable manner. As for the kingpin 10 shown in FIG. 2, the kingpin 10' also has a longitudinal opening 12', which leads from the free end face 14' to the side surface 16' of the flange 8', which is assigned to the axle centre part 2' of the portal axle.

In contrast to the longitudinal opening 12, 13 of the kingpin 10. 11 with its constant opening diameter, the longitudinal opening 12' of the kingpin 10', however, has a first section 12a' starting from the side surface 16' of the flange 8' assigned to the axle centre part 2', which transitions via a tapered step into a second section 12b', which leads to the free end face 14a' of the kingpin 12'. The first section 12a' has a larger diameter than the second section 12b' and extends in the region of the kingpin 10' in which the kingpin 10' has its largest volume.

For the sake of clarity, the alternative embodiment with the prefabricated kingpin 8' shrunk into the opening 22' of the flange 8' is shown here only for the first end section 6' of the portal axle concerned, the shape and structure of which otherwise correspond to those of portal axle 1. Of course, the other end section 7 of the portal axle 1 has a correspondingly designed arrangement of flange and kingpin. Here, too, the flanges 8' and the corresponding flange (not shown here) on the other side of the axle centre part 2' have been forged in one piece with the axle centre part 2'.

REFERENCE NUMERALS

FIGS. 1, 2, 4, 5:
  1 portal axle
  2 axle centre part
  3 upper side of axle centre part 2
  4, 5 narrow sides of the axle centre part 2
  6, 7 end sections of the axle centre part 2
  8, 9 flanges
  10, 11 kingpins
  12, 13 longitudinal openings of the kingpins 10, 11
  14, 15 free end faces of the kingpins 10, 11
  16, 17 side surfaces of the flanges 8, 9
  18, 19 longitudinal openings
  20, 21 longitudinal sides of the axle centre part 2
  23 underside of the axle centre part 2
  B width of the axle centre part 2
  L length of axle centre part 2
  L-L longitudinal axis of the axle centre part 2
  L10, L11 longitudinal axes of the kingpins 10, 11
FIG. 3:
  2' axle centre part
  6' end section of the axle centre part 2'
  8' flange of the alternatively designed portal axle
  10 kingpin of the alternatively designed portal axle
  12' longitudinal opening of the kingpins 10'
  12a' first section of the longitudinal opening 12'
  12b' second section of the longitudinal opening 12'
  14 free end face of the kingpin 10'
  16 side surface of the flange 8'
  22 opening of the flange 8'

The invention claimed is:

1. A portal axle for a rail vehicle, comprising the following moulded components:

an axle centre part extending along a longitudinal axis, and two kingpins, one of which sits on a first end section of the axle centre part and a second on a second end section of the axle centre part formed opposite to the first end section, wherein the kingpins are oriented away from the axle centre part and form an axis of rotation in use for a rail wheel rotatably mounted on the respective kingpin, wherein the kingpins each have a longitudinal opening formed as a through-opening, wherein the axle centre part has an upper side assigned to a body of the rail vehicle in use and wherein the kingpins are positioned on the upper side of the axle centre part, and wherein a longitudinal opening extending in the longitudinal direction of the portal axle is formed in at least one of the moulded components, wherein the at least one longitudinal opening is moulded into the at least one of the moulded components and wherein the at least one longitudinal opening is designed as a through-opening that passes through the respective moulded component.

2. The portal axle according to claim 1, wherein the longitudinal opening has a first section extending in the longitudinal direction of the longitudinal opening and a second section extending up to a free end face of the kingpin positioned away from the axle centre part, the diameter of the second section being smaller than the diameter of the first section.

3. The portal axle according to claim 1, wherein at least two longitudinal openings are moulded into the axle centre part.

4. The portal axle according to claim 1, wherein the moulded components are it is manufactured from a steel material in one piece.

5. The portal axle according to claim 4, wherein the at least one longitudinal opening is treated with corrosion protection at least on an inner surface of the at least one longitudinal opening.

6. The portal axle according to claim 4, wherein at least a portion of an inner surface of the at least one longitudinal opening has a hardness in an edge layer adjacent to the inner surface that is increased as a result of a chemical/thermal edge layer treatment.

7. The portal axle according to claim 4, wherein at least an inner surface of the at least one longitudinal opening is provided with an oxide layer.

8. A method for producing a portal axle according to claim 1, comprising the following work steps:

a) provision of a portal axle blank comprising the "axle centre part" and "kingpin" moulded components; and b) introduction of a longitudinal opening in at least one of the moulded components.

9. The method according to claim 8, wherein the provision of the portal axle blank (work step a)) comprises forging and/or casting the blank from a steel material.

10. The method according to claim 8, further comprising:

c) edge layer treatment of the portal axle in at least one of (i) a region of an inner surface of the longitudinal opening or (ii) a region of an outer surface of the portal axle.

11. The method according to claim 10, wherein the portal axle is subjected to edge layer treatment throughout after the longitudinal opening has been introduced.

12. The method according to claim 10, wherein work step c) is carried out as chemical/thermal surface layer treatment.

13. The method according to claim 10, wherein the edge layer treatment increases the N and/or C content at least in the region of the inner surface of the longitudinal opening in an edge layer adjacent to the respective inner surface of the longitudinal opening.

14. The method according to claim 8, further comprising oxidation of at least one of (i) an inner surface of the longitudinal opening or (ii) an outer surface of the portal axle.

* * * * *